(12) United States Patent
Paul

(10) Patent No.: US 6,384,839 B1
(45) Date of Patent: May 7, 2002

(54) METHOD AND APPARATUS FOR RENDERING SUB-PIXEL ANTI-ALIASED GRAPHICS ON STRIPE TOPOLOGY COLOR DISPLAYS

(75) Inventor: Steven William Paul, Belchertown, MA (US)

(73) Assignee: Agfa Monotype Corporation, Wilmington, DE (US)

(*) Notice: Subject to any disclaimer, the term of this patent is extended or adjusted under 35 U.S.C. 154(b) by 0 days.

(21) Appl. No.: 09/400,153

(22) Filed: Sep. 21, 1999

(51) Int. Cl.[7] ................................................ G09G 5/00
(52) U.S. Cl. ...................................................... 345/613
(58) Field of Search .......................... 345/613, 441–443, 345/136, 152

(56) References Cited

U.S. PATENT DOCUMENTS

| | | | |
|---|---|---|---|
| 4,271,246 A | 6/1981 | Sato et al. ...................... 430/7 |
| 6,188,385 B1 | 6/1981 | Hill et al. .................... 345/136 |
| 4,506,956 A | 3/1985 | Dir ............................. 350/339 |
| 4,704,605 A * | 11/1987 | Edelson ....................... 340/728 |
| 4,851,825 A | 7/1989 | Naiman ....................... 340/728 |
| 4,908,780 A | 3/1990 | Priem et al. ................. 364/521 |
| 4,987,043 A | 1/1991 | Roosen et al. |
| 5,132,674 A | 7/1992 | Bottorf ........................ 340/728 |
| 5,264,835 A * | 11/1993 | Shaw et al. .................. 345/150 |
| 5,287,428 A * | 2/1994 | Kelleher ...................... 395/132 |
| 5,299,308 A | 3/1994 | Suzuki et al. ................ 345/152 |
| 5,317,679 A | 5/1994 | Ueda et al. ................... 395/132 |
| 5,339,092 A | 8/1994 | Johnson et al. ............. 345/136 |
| 5,341,153 A | 8/1994 | Benzschawel et al. ...... 345/152 |
| 5,375,002 A | 12/1994 | Kim et al. ................... 358/521 |
| 5,404,432 A | 4/1995 | Koopman et al. .......... 395/144 |
| 5,432,898 A | 7/1995 | Curb et al. .................. 395/141 |
| 5,502,795 A * | 3/1996 | Shirouzu ..................... 395/109 |
| 5,543,819 A | 8/1996 | Farwell et al. .............. 345/150 |
| 5,544,294 A | 8/1996 | Cho et al. .................... 395/141 |
| 5,555,359 A | 9/1996 | Choi et al. ................... 395/141 |
| 5,559,529 A | 9/1996 | Maher ......................... 345/136 |
| 5,559,530 A | 9/1996 | Yamashita et al. .......... 345/136 |
| 5,581,680 A | 12/1996 | Sfarts et al. ................. 382/284 |
| 5,594,854 A | 1/1997 | Baldwin et al. ............. 395/141 |
| 5,600,763 A | 2/1997 | Greene et al. ............... 395/120 |
| 5,625,772 A | 4/1997 | Yamazaki et al. .......... 395/167 |
| 5,684,510 A | 11/1997 | Brassell et al. ............. 345/143 |
| 5,719,595 A | 2/1998 | Hoddie et al. .............. 345/136 |
| 5,737,455 A | 4/1998 | Harrington et al. ......... 382/284 |

(List continued on next page.)

FOREIGN PATENT DOCUMENTS

WO    WO 00/21068    4/2000    ......... G09G/5/0210

OTHER PUBLICATIONS

"Computer Graphics: Principles and Practice" by Foley et. al., Addison Wesley Publishers (2$^{nd}$ edition, 1990) section 3.17 pp. 132–140, section 14.10 pp. 617–645, section 3.2 pp. 72–79, section 3.6 pp. 92–97, and section 13.1.1 pp. 564–567.

Primary Examiner—Jeffery Brier
Assistant Examiner—Gautam R. Patel
(74) Attorney, Agent, or Firm—Robert A. Sabourin; Joseph D. King

(57) ABSTRACT

An anti-aliasing method and apparatus for use with a stripe topology color display provides sub-pixel level smoothing in a manner which enhances the apparent resolution of the display, yielding enhanced object shape and positioning, while maintaining accurate foreground and background colors. The method or apparatus includes the steps or means of: generating a 1 bit per pixel super-sampled bitmap for the image, in which there is greater than or equal to 1 bit for each sub-pixel of the image; determining an average intensity I for each position of the image from the bitmap; determining a sub-pixel intensity S for each sub-pixel using the average intensity I, a foreground intensity F and a background intensity B; and setting a sub-pixel value V for each sub-pixel to produce the sub-pixel intensity on the display.

18 Claims, 6 Drawing Sheets

U.S. PATENT DOCUMENTS

| | | | |
|---|---|---|---|
| 5,757,375 A | 5/1998 | Kawase | 345/429 |
| 5,761,485 A | 6/1998 | Munyan | 395/500 |
| 5,771,048 A | 6/1998 | Nankou et al. | 345/471 |
| 5,815,162 A | 9/1998 | Levine | 345/443 |
| 5,815,605 A | 9/1998 | Koike | 382/269 |
| 6,128,000 A * | 10/2000 | Jouppi et al. | 335/136 |
| 6,137,918 A * | 10/2000 | Harrington et al. | 382/269 |
| 6,219,025 B1 | 4/2001 | Hill et al. | 345/136 |

* cited by examiner

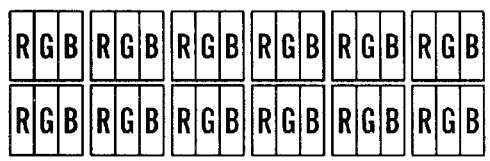
FIG. 1A -STRIPE TOPOLOGY COLOR DISPLAY
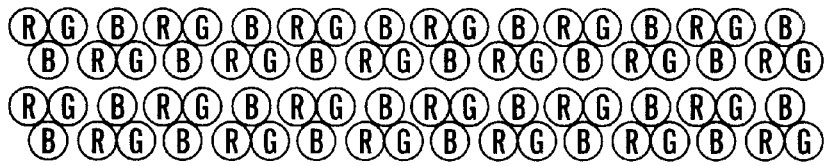
FIG. 1B -DELTA TOPOLOGY COLOR DISPLAY
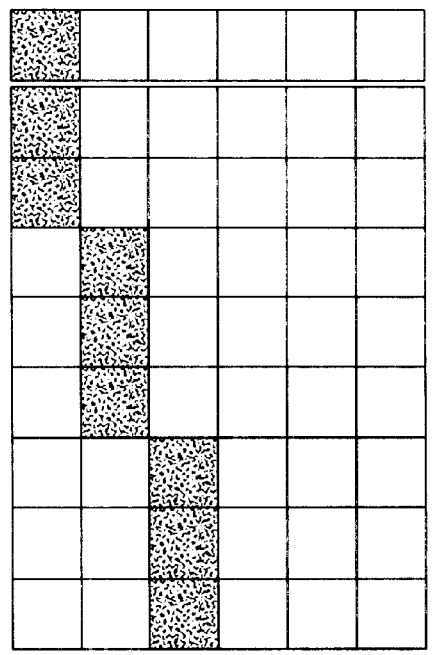
FIG. 2A -PIXEL VALUES  FIG. 2B -PIXEL APPEARANCE

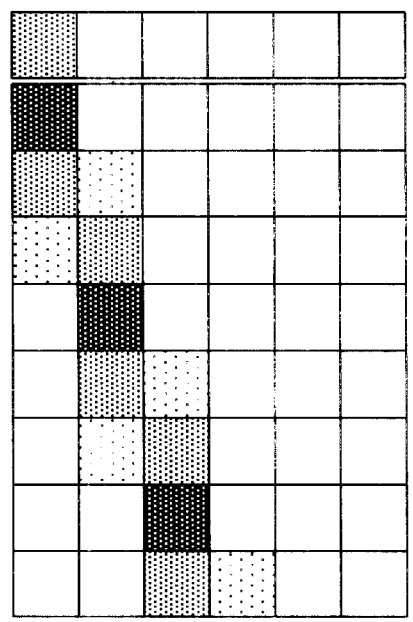
FIG. 3A-PIXEL VALUES  FIG. 3B-PIXEL APPEARANCE
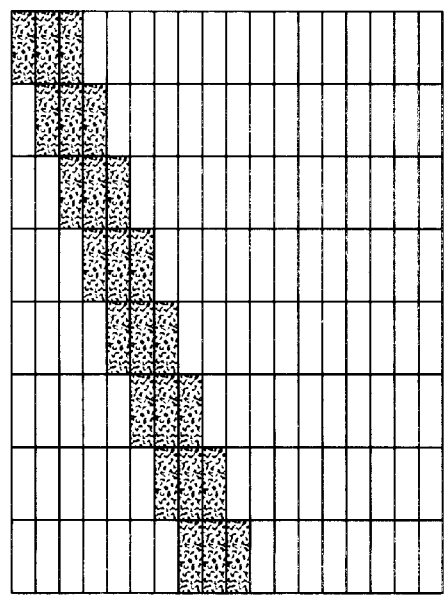
FIG. 4A-BITMAP VALUES  FIG. 4B-BITMAP APPEARANCE

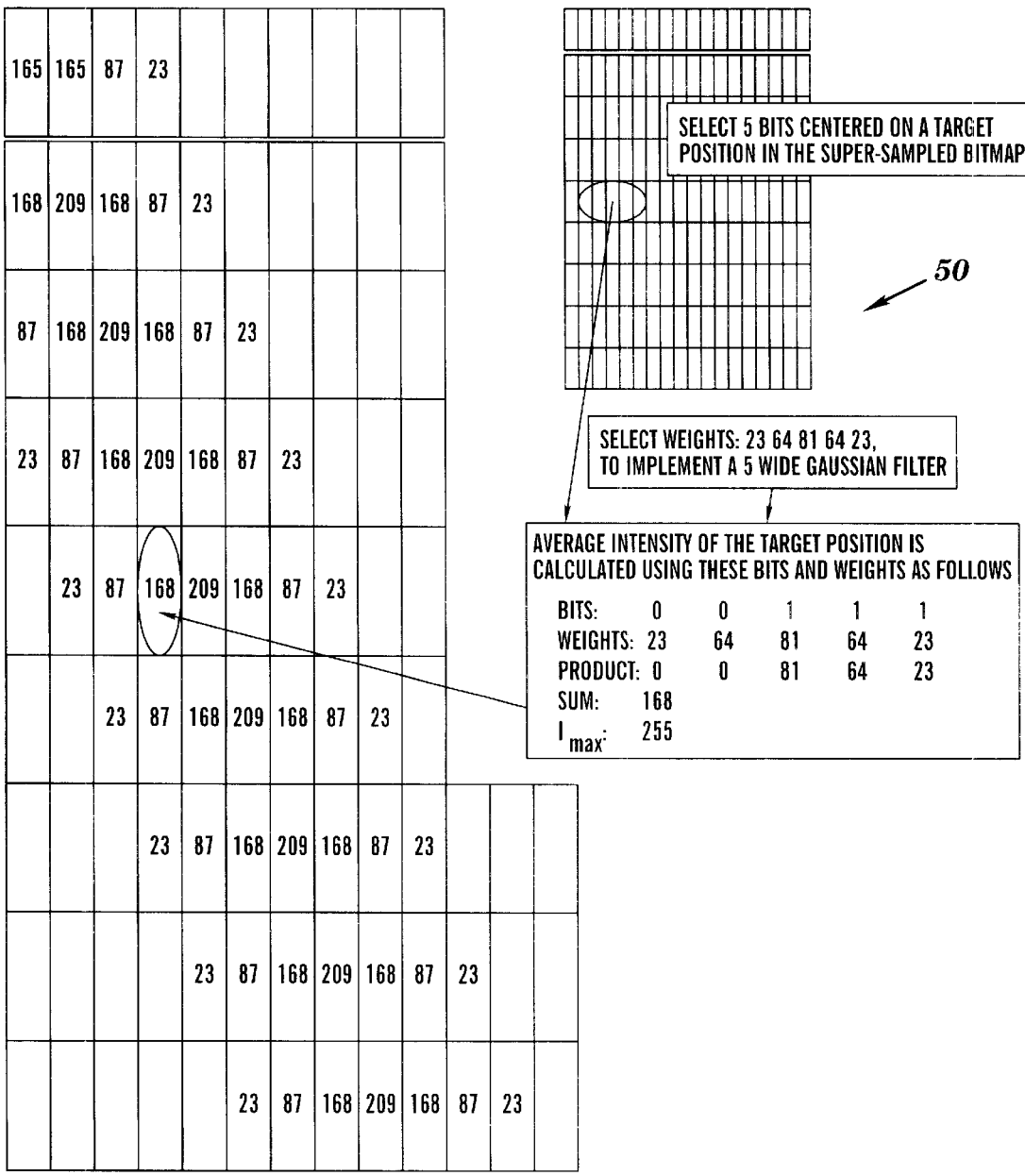
FIG. 5 - DETERMINING AVERAGE INTENSITIES OF SUPER-SAMPLED BITMAP

I: AVERAGE INTENSITIES (THE LAST ROW OF THE ARRAY FROM FIG. 5)

B: (ARBITRARY) BACKGROUND INTENSITIES

F: (ARBITRARY) FOREGROUND INTENSITIES

SAMPLE CALCULATION OF SUB-PIXEL INTENSITY S:
$$S = B + (F-B) * I/I_{max}$$
$$= 248 + (51-248)*168/255$$
$$= 119$$

S: SUB-PIXEL INTENSITIES

SAMPLE CALCULATION OF SUB-PIXEL VALUE, WITH GAMMA = 2.2
$$V = V_{max} * (I/I_{max})^{(1/GAMMA)}$$
$$= 255*(119/255)^{.454545}$$
$$= 181$$

V: SUB-PIXEL VALUES

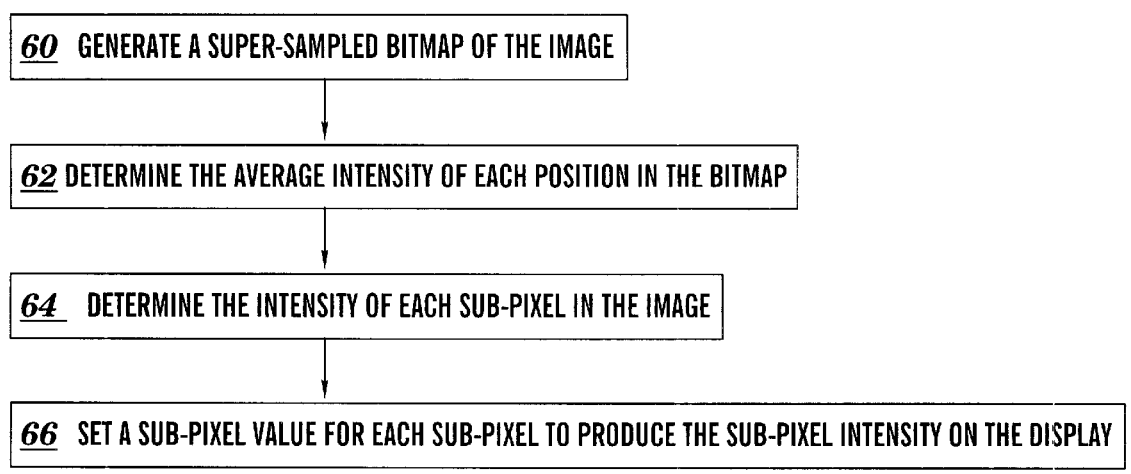
FIG. 7 -GENERATING A SUB-PIXEL ANTI-ALIASED IMAGE OF AN OBJECT

METHOD AND APPARATUS FOR RENDERING SUB-PIXEL ANTI-ALIASED GRAPHICS ON STRIPE TOPOLOGY COLOR DISPLAYS

BACKGROUND OF THE INVENTION

1. Field of the Invention

The invention relates generally to a method and apparatus of sub-pixel rendering of graphic objects, and more particularly, to a method and apparatus for sub-pixel anti-aliased display of typefaces on stripe topology color displays.

2. Description of the Prior Art

Originally, a 'bitmap' was a rectangular array of 'bits' (0's or 1's) which mapped to an array of 'pixels' (short for picture elements) on a display device, turning the pixel ON or OFF. The term 'pixel' is used to mean both the area of the display and the data mapped to it.

Later, when display devices became capable of displaying more than 2 values, the concepts of pixel and bitmap were extended to provide multiple values. Today, if a bitmap can represent $2^n$ distinct values, it is said to have 'n bits per pixel' or to be 'n deep'; each pixel is represented by n bits.

Color displays for stretched the concepts. On a color display a pixel consists of 3 components or 'sub-pixels', one for each of the red, green and blue primary components of the color. A full description of the data in a color bitmap (or a color pixel) must include the number of bits used to represent each of the components. For example: a common color bitmap on a modem computer is 24 bits deep, having 8 bits for each of red, green and blue; thus it can represent $2^{24}$ or 16,777,216 different colors.

A stripe topology color display is one in which the three sub-pixels of a pixel are arranged as contiguous vertical bars. Each sub-pixel is roughly three times as high as it is wide, thus each pixel is roughly square. Examples of the stripe topology display are the SONY Trinitron®CRT (cathode ray tube), and most newer color LCDs (liquid crystal displays). FIG. 1A illustrates a portion of a stripe topology display with pixels composed of contiguous Red, Green and Blue rectangular sub-pixels.

In contrast, a delta topology color display is one in which the sub-pixels of each pixel are roughly circular and are arranged in an equilateral triangle. Most older commercial televisions are of the delta topology. FIG. 1B illustrates a portion of a delta topology color display with pixels composed of contiguous Red, Green and Blue circular sub-pixels. In both FIGS. 1A and 1B the spacing between pixels is exaggerated for clarity.

All color displays use various weighted combinations of the sub-pixels to provide the full color spectrum for each pixel. At normal viewing distances, the human eye doesn't see the closely spaced color sub-pixels individually, but rather mixes the adjacent colors to form a blend.

Herein, the term 'foreground' refers to the color of the object to be imaged; and 'background' refers to the color already in place prior to imaging the object.

The term 'aliasing' (also known as the jaggies) is an undesirable effect in which an edge of a graphic object is characterized by a stair-step appearance (see FIGS. 2A and 2B). Aliasing occurs because of the relatively large size of the display pixel, which forces a large incremental change, in comparison with an idealized object of infinite precision. In FIGS. 2A and 2B, pixel values of 255 correspond to black, whereas all other pixel values are 0, corresponding to white.

Throughout the drawings all pixel, sub-pixel and bitmap values are equal to 0 unless otherwise indicated.

Typical anti-aliasing techniques operate at the pixel level, by varying certain pixel intensities to give the illusion of greater resolution. For example: in Gupta-Sproull line drawing, the intensity of a pixel is changed based on the perpendicular distance from the ideal line. Pixels on the line are drawn at full foreground intensity; while pixels far from the line are drawn with intensity nearer that of the background. At normal viewing distances, the eye perceives this as a 'smooth' line of constant intensity. (see FIGS. 3A and 3B).

A practical method of generalized anti-aliasing has been derived from sampling theory. It involves computing a weighted average or 'filter' for a small neighborhood around each pixel. A simple example: add twice the value of the target pixel to the values of the pixels above, below, left and right of the target pixel; then divide by 6. In practice, the filters suggested by sampling theory are somewhat more complex than the prior example, but fall into the same broad class of center weighted low pass filters.

For a brief introduction to signal processing, anti-aliasing, and filtering, see sections 3.17, pages 132–40 and 14.10, pages 617–45 of "Computer Graphics: Principles and Practice" by Foley et al., Addison Wesley Publishers ($2^{nd}$ edition, 1990). These sections are herein incorporated by reference for supplemental background information which is non-essential, but helpful in understanding the principles of the invention.

SUMMARY OF THE INVENTION

It is an object of the present invention to provide an anti-aliasing method and apparatus for use with a stripe topology color display which provides sub-pixel level smoothing in a manner which enhances the apparent resolution of the display, yielding enhanced object shape and positioning, while maintaining accurate foreground and background colors.

The inventive method or apparatus includes the steps or means of: generating a 1 bit per pixel super-sampled bitmap for the image, in which there is greater than or equal to 1 bit for each sub-pixel of the image; determining an average intensity I for each position of the image from the bitmap; determining a sub-pixel intensity S for each sub-pixel using the average intensity I, a foreground intensity F and a background intensity B; and setting a sub-pixel value V for each sub-pixel to produce the sub-pixel intensity on the display. The method can be implemented via code from a computer-readable medium in a computer system.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIG. 1A is an illustration of a stripe topology color display;

FIG. 1B is an illustration of a delta topology color display;

FIG. 2A shows pixel values for a line which illustrates aliasing;

FIG. 2B shows the pixel appearance for the line which illustrates aliasing in FIG. 2A;

FIG. 3A shows pixel values of a line drawn with pixel based anti-aliasing;

FIG. 3B shows the pixel appearance of the line drawn with pixel based anti-aliasing in FIG. 3A;

FIG. 4A shows the bit values in a super-sampled bitmap of a line;

FIG. 4B shows the appearance of the super-sampled bitmap of the line of FIG. 4A;

FIG. 5 illustrates an array of average intensities calculated for a super-sampled bitnap;

FIG. 6A illustrates an array of average intensities from FIG. 5;

FIG. 6B illustrates an array of background intensities;

FIG. 6C illustrates an array of foreground intensities;

FIG. 6D illustrates an array of sub-pixel intensities;

FIG. 6E illustrates an array of sub-pixel values;

FIG. 7 is a flowchart of the inventive method; and

DETAILED DESCRIPTION OF THE PREFERRED EMBODIMENTS

Figure 6A:
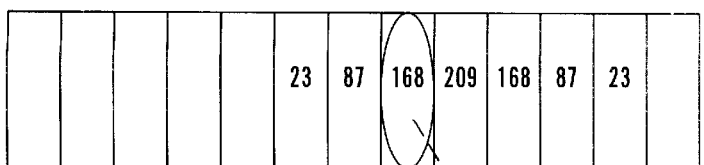
FIGS. 6A–E illustrate the calculation of sub-pixel intensities and sub-pixel values for a super-sampled bitmap.
Figure 6B:
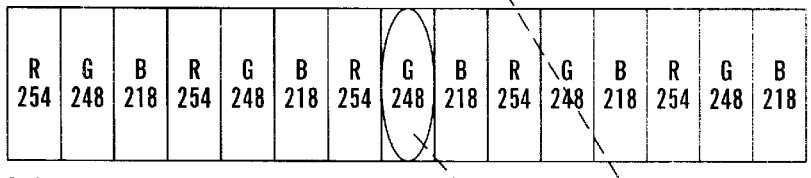
Figure 6C:
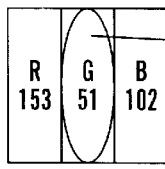
Figure 6D:
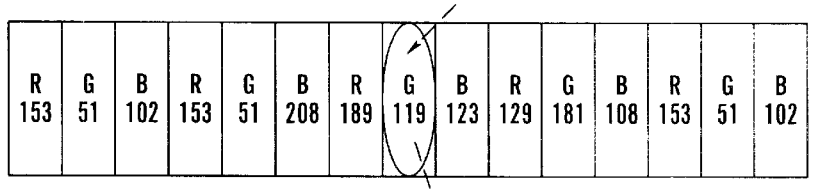
Figure 6E:
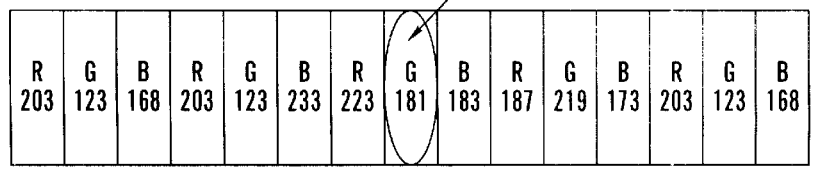
Figure 8:
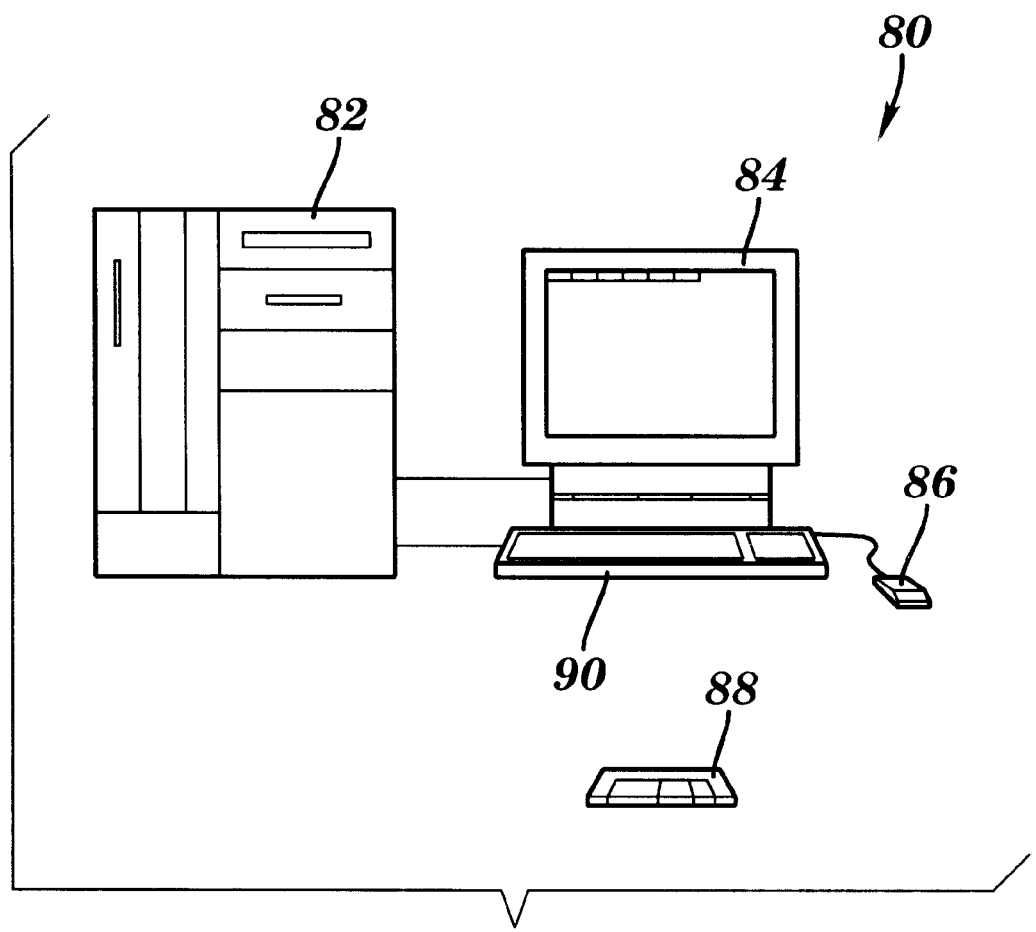
FIG. 8 illustrates a computer system for implementing the method of FIG. 7.

One embodiment of a system for implementing a method sub-pixel anti-aliased graphics on a stripe topology color display is illustrated in FIG. 8. The system 80 includes the following interconnected components: a computer 82; a keyboard; a mouse 86; and a (stripe topolgy) cathode ray tube monitor 84. Other peripherals, including various input/output components, can be added as desired. The inventive method can be loaded into the computer as firmware, or as software in computer memory, or it can be run from computer-readable medium, such as a CDROM or disk 88. A liquid crystal display can replace the CRT monitor 84. The computer system 80 could be any form of computer such as a stand-alone computer, a laptop, a hand held processor, an equipment controller, part of an integrated control system, etc.

To understand the method, first, consider the special case of drawing a black object on a white background. In the case of whole pixel anti-aliasing, a dark object must start and stop on a pixel boundary. However, using sub-pixel anti-aliasing, we manipulate the sub-pixels individually. Thus, we can start or stop the dark segment at a sub-pixel boundaries, effectively increasing the horizontal resolution by a factor of 3. This results in increased accuracy in displaying the shape and position of an object compared with conventional drawing or pixel based anti-aliasing (compare FIGS. 2b, 3b and 4b). Moreover, the present invention is able to derive similar benefits in the general case of drawing an object in any foreground color, over any background color.

Using sub-pixel anti-aliasing techniques for typefaces on a stripe topology color display yields numerous advantages over conventional anti-aliasing schemes. Accurate inter-character spacing is extremely important to the readability of text. At small point sizes, inter-character spacing is greatly improved by the possibility of sub-pixel character positioning. The weight of a typeface—the ratio of the width of strokes to the height of a character—is extremely important to the appearance and readability of text. At small point sizes, the weight of a typeface is greatly improved by the possibility of fractional pixel stroke widths (eg: 1 and ⅓ pixels). Finally, the reduction in the jaggies of italic characters is further improved by sub-pixel control.

One must use some care in setting individual sub-pixels, otherwise some objectionable color artifacts may appear. This so called 'color fringe' is caused by sudden spatial changes in perceived brightness among sub-pixels. There are two basic ways to eliminate this phenomenon. The first is to place additional space between pixels of potentially different brightness—LCD manufacturers use this technique by the inclusion of an opaque mask between the pixels of their displays. The second is to mediate the maximum difference in brightness between adjacent sub-pixels—the present invention takes this approach.

The flowchart of FIG. 7 illustrates a preferred method for implementing the principles of the invention. The basic steps include: generating 60 a bitmap for the image; determining 62 an average intensity for each position of the image from the bitmap; determining 64 a sub-pixel intensity for each sub-pixel of the image; and setting 66 a sub-pixel value for each sub-pixel to produce the sub-pixel intensity on a display. These steps are each implemented by the computer system 80 (see FIG. 8), specifically by commands resident in firmware or software which are carried out by the processing capabilities of the computer 82.

Step 60 involves generating a 1 bit per pixel bitmap for the image to be rendered. This is done so as to generate at least 1 bit for each sub-pixel of the image, thus providing the basis of sub-pixel control of the image. Generating a bitmap at normal resolution would overlay a grid so that each cell corresponds to one pixel of the final image. The current method generates a super-sampled bitmap by using a grid having more than one cell per pixel of the final image. The bitmap may be made using any standard rasterization (scan conversion) algorithm. The image is overlaid with a grid 50 as illustrated in FIG. 5, each cell of the grid 50 representing a bit in the bitmap. If a cell lies inside the image, the corresponding bit is set to 1, otherwise the bit is set to 0. This procedure is further described in Foley et al., supra, at sections 3.2, pages 72–79 and 3.6, pages 92–97, these sections herein being incorporated by reference for supplemental background information which is non-essential, but helpful in understanding the principles of the invention.

Step 62 generates average intensities from the bitmap of step 60. This is done to mediate the maximum differences in intensity between adjacent positions of the bitmap. A weighted average is computed of the bits in a neighborhood of each position. The best aesthetics are obtained using a weights based on a center weighted low pass filter, such as a gaussian or bartlett filter. (see FIG. 5)

In the example illustrated in FIG. 5, for a one dimensional weighted average based on a 5 wide gaussian filter, the weights {23 64 81 64 23} are obtained. These weights are applied to a five wide neighborhood centered on the target position {0 0 1 1 1}; where the average intensity of the target position is: (23*0+64*0+81*1+64*1+23*1)=168. The maximum intensity for this example is $I_{max}=255$. In practice the bit pattern 00111 is looked up in a table of pre-computed average values.

Steps 64 and 66 are explained in conjunction with FIGS. 6A–E. Step 64 assigns the sub-pixel intensity S for each sub-pixel based on the intensity of the foreground color F, the intensity of the background color B, and the average intensity I from step 62. The calculation is a linear interpolation:

$$S=B_k+(F_k-B_k)*I/I_{max}$$

where: $B_k$ means the intensity of the appropriate component (red, or green or blue) of the background color, and $I_{max}$ is the maximum intensity of step 62. In the example of FIGS. 6A–E, for a given green sub-pixel, the average intensity I is 168, the background intensity B is 248, the foreground intensity is 51, and the sub-pixel intensity is calculated as 119.

Step 66 determines the color component value needed by the particular display hardware to obtain, on the display, the sub-pixel intensity S calculated in step 64. This calculation is based on the well known gamma correction formulae which relate intensity measured from a CRT with the gun voltage irradiating the phosphors. An expression which relates a requested color value V with the resulting display intensity I is:

$$V=V_{max}*(I/I_{max})^{(1/gamma)}$$

where: $V_{max}$ is a maximum color value;
$I_{max}$ is a maximum sub-pixel intensity; and
gamma is the gamma of the particular display device.

a For the example of FIGS. 6A–E, $V_{max}$ is 255, $I_{max}$ is 255, I is 119, gamma is 2.2 and V is calculated as 181. The maximum color value $V_{max}$ depends on the hardware. For example: if a system had 24 bit color, using 8 bits for each component, $V_{max}$ would be $2^8-1$ or 255. The value of $I_{max}$ depends on the particular average used in step 62. Gamma is determined solely by the video hardware. Most modern video equipment, including CRT and LCD displays have a gamma value in the range 2.2 to 2.4. Additional information about gamma correction is available in Foley et al., supra, at section 13.1.1, pages 564–67 herein incorporated by reference for supplemental background information which is non-essential, but helpful in understanding the principles of the invention.

The above descriptions of the present invention are merely illustrative and represent a limited number of the possible specific embodiments applicable in accordance with the principles of the invention. Numerous and varied other arrangements may be readily devised by those skilled in the art in view of the invention as claimed.

What is claimed is:

1. A method of displaying an image on a stripe topology color display using sub-pixel anti-aliasing, the method comprising:

generating a 1 bit per pixel super-sampled bitmap for the image, in which there is greater than or equal to 1 bit for each sub-pixel of the image;

determining an average intensity I for each position of the image from the bitmap;

determining a sub-pixel intensity S for each said sub-pixel using the average intensity I, a foreground intensity F and a background intensity B; and setting a sub-pixel value V for each said sub-pixel to produce the sub-pixel intensity on the display.

2. The method of claim 1 wherein the super-sampled bitmap is generated at the normal vertical resolution and 3 times the normal horizontal resolution.

3. The method of claim 2 wherein the average intensity for each said sub-pixel is determined by taking a 5 wide center weighted average at each bit in the super-sampled bitmap.

4. The method of claim 1 wherein the sub-pixel intensity S is determined from the average intensity 'I', the foreground intensity 'F', the background intensity 'B', and the maximum intensity $I_{max}$ as:

$$S=B+(B-F)*I/I_{max}.$$

5. The method of claim 1 wherein the sub-pixel value for each said sub-pixel is determined as:

$$V=V_{max}*(I/I_{max})^{(1/gamma)}$$

where: $V_{max}$ is a predetermined maximum color value;
$I_{max}$ is a maximum average intensity; and
gamma is a constant of the display hardware.

6. The method of claim 1 wherein the foreground intensity and the background intensity are determined using a table lookup from pairs of x-intercept data generated during rasterization of a character outline.

7. A computer-readable medium having code to cause a computer system to display an image on a stripe topology color display using sub-pixel anti-aliasing, the code operating by:

generating a 1 bit per pixel super-sampled bitmap for the image, in which there is greater than or equal to 1 bit for each sub-pixel of the image;

determining an average intensity I for each position of the image from the bitmap;

determining a sub-pixel intensity S for each said sub-pixel using the average intensity I, a foreground intensity F and a background intensity B; and setting a sub-pixel value V for each said sub-pixel to produce the sub-pixel intensity on the display.

8. The computer-readable medium of claim 7 wherein the super-sampled bitmap is generated at the normal vertical resolution and 3 times the normal horizontal resolution.

9. The computer-readable medium of claim 8 wherein the average intensity for each said sub-pixel is determined by taking a 5 wide center weighted average at each bit in the super-sampled bitmap.

10. The computer-readable medium of claim 7 wherein the sub-pixel intensity S is determined from the average intensity 'I', the foreground intensity 'F', the background intensity 'B', and the maximum intensity $I_{max}$ as:

$$S=B+(B-F)*I/I_{max}.$$

11. The computer-readable medium of claim 7 wherein the sub-pixel value for each said sub-pixel is determined as:

$$V=V_{max}*(I/I_{max})^{(1/gamma)}$$

where: $V_{max}$ is a predetermined maximum color value;
$I_{max}$ is a maximum average intensity; and
gamma is a constant of the display hardware.

12. The computer-readable medium of claim 7 wherein the foreground intensity and the background intensity are determined using a table lookup from pairs of x-intercept data generated during rasterization of a character outline.

13. A system for displaying an image on a stripe topology color display using sub-pixel anti-aliasing, the system comprising:

means for generating a 1 bit per pixel super-sampled bitmap for the image, in which there is greater than or equal to 1 bit for each sub-pixel of the image;

means for determining an average intensity I for each position of the image from the bitmap;

means for determining a sub-pixel intensity S for each said sub-pixel using the average intensity I, a foreground intensity F and a background intensity B; and means for setting a sub-pixel value V for each said sub-pixel to produce the sub-pixel intensity on the display.

14. The system of claim 13 wherein the super-sampled bitmap is generated at the normal vertical resolution and 3 times the normal horizontal resolution.

15. The system of claim 14 wherein the average intensity for each said sub-pixel is determined by taking a 5 wide center weighted average at each bit in the super-sampled bitmap.

16. The system of claim 13 wherein the sub-pixel intensity S is determined from the average intensity 'I', the foreground intensity 'F', the background intensity 'B', and the maximum intensity $I_{max}$ as:

$$S=B+(B-F)*I/I_{max}.$$

17. The system of claim 13 wherein the sub-pixel value for each said sub-pixel is determined as:

$$V=V_{max}*(I/I_{max})^{(1/gamma)}$$

where: $V_{max}$ is a predetermined maximum color value;

$I_{max}$ is a maximum average intensity; and gamma is a constant of the display hardware.

18. The system of claim 13 wherein the foreground intensity and the background intensity are determined using a table lookup from pairs of x-intercept data generated during rasterization of a character outline.

* * * * *